United States Patent
Yoshida et al.

(10) Patent No.: US 7,859,532 B2
(45) Date of Patent: Dec. 28, 2010

(54) GENERATING CHARACTER IMAGES BASED UPON DISPLAY CONDITIONS

(75) Inventors: Akihiko Yoshida, Tokyo (JP); Takeshi Sanda, Tokyo (JP); Takeshi Kawamorita, Toukyou (JP); Kazuhiro Kataoka, Kanagawa (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 561 days.

(21) Appl. No.: 11/680,189

(22) Filed: Feb. 28, 2007

(65) Prior Publication Data
US 2007/0206003 A1 Sep. 6, 2007

(30) Foreign Application Priority Data
Mar. 1, 2006 (JP) .............................. 2006-054456

(51) Int. Cl.
G06T 17/00 (2006.01)
A63F 13/00 (2006.01)
(52) U.S. Cl. ......................................... 345/428; 463/32
(58) Field of Classification Search ........................ None
See application file for complete search history.

(56) References Cited

U.S. PATENT DOCUMENTS

| | | | | |
|---|---|---|---|---|
| 5,736,982 A | * | 4/1998 | Suzuki et al. | 715/706 |
| 5,952,993 A | * | 9/1999 | Matsuda et al. | 345/474 |
| 6,009,460 A | * | 12/1999 | Ohno et al. | 709/204 |
| 6,392,644 B1 | | 5/2002 | Miyata et al. | |
| 7,101,284 B2 | * | 9/2006 | Kake et al. | 463/31 |
| 7,213,206 B2 | * | 5/2007 | Fogg | 715/706 |
| 7,460,118 B2 | * | 12/2008 | Hayakawa | 345/419 |
| 2001/0049301 A1 | * | 12/2001 | Masuda et al. | 463/33 |

(Continued)

FOREIGN PATENT DOCUMENTS

JP 8-263690 10/1996

(Continued)

OTHER PUBLICATIONS

"Dengeki PlayStation Oct. 3, 2006 issue (Final Fantasy XII)", Media Works Inc., received on Feb. 28, 2006, vol. 12, No. 10, pp. 14-17, together with an English language partial translation thereof.

(Continued)

Primary Examiner—Daniel F Hajnik
(74) Attorney, Agent, or Firm—Greenblum & Bernstein, P.L.C.

(57) ABSTRACT

In a 2D and 3D character determining process, the contents of display status information indicating a display status of a non-player character, such as a display position and display brightness, is confirmed. It is then determined whether or not the display status of the non-player character satisfies a non-display condition. In the case where it is determined that the non-display condition is satisfied, it is determined that the character is not drawn in a virtual three-dimensional space. Subsequently, it is determined whether or not the display status of the non-player character satisfies a 2D display condition. In the case where it is determined that the 2D display condition is satisfied, it is determined that the character is drawn as a two-dimensional character. In the case where it is determined that the 2D display condition is not satisfied, it is determined that the character is drawn as a three-dimensional character.

20 Claims, 4 Drawing Sheets

U.S. PATENT DOCUMENTS

2006/0258444 A1* 11/2006 Nogami et al. ............... 463/30
2006/0258449 A1   11/2006 Yasui et al.

FOREIGN PATENT DOCUMENTS

| JP | 11-339068   | 12/1999 |
|----|-------------|---------|
| JP | 2000-207575 | 7/2000  |
| JP | 2001-109911 | 4/2001  |
| JP | 2003-141560 | 5/2003  |
| JP | 2004-141435 | 5/2004  |
| JP | 2004-167271 | 6/2004  |

OTHER PUBLICATIONS

"Dengeki PlayStation Nov. 6, 2004 issue (Final Fantasy XII)", Media Works Inc., Jun. 11, 2004, vol. 10, No. 15, pp. 54-61, together with an English language partial translation thereof.
English language Abstract of JP 2004-167271, 2004.
English language Abstract of JP 2004-141435, 2004.
Dobbyn et al., "Geopostors: A Real-Time Geometry/Impostor Crowed Rendering System," ACM Transactions on Graphics ACM USA, vol. 24, No. 3, Jul. 2005, pp. 933-940, XP002438272.
English language Abstract of JP 2003-141560, 2007.
"C Magazine vol. 12, No. 1 (Technique for a high-speed 3D game from a viewpoint of a Doom source code and a thinking routine)", Softbank Publishing, Co., Ltd., Jan. 1, 2000, vol. 12, No. 1, pp. 42-55, together with an English language partial translation of the same.
"bit Vol. 30, No. 9 (PAW, the shared virtual world on the Internet; Let's walk with your pet in the strange island!)", Kyoritsu Shuppan Co., Ltd., Sep. 1, 1998, vol. 30, No. 9, pp. 2-10, together with an English language partial translation of the same.
English language Abstract of JP 2000-207575, 2000.
English language Abstract of JP 2001-109911, 2008.
English language Abstract of JP 11-339068, 2008.
English language Abstract of JP 8-263690, 2008.

* cited by examiner

GENERATING CHARACTER IMAGES BASED UPON DISPLAY CONDITIONS

CROSS-REFERENCE TO RELATED APPLICATION

The present disclosure relates to subject matter contained in Japanese Patent Application No. 2006-054456, filed on Mar. 1, 2006, the disclosure of which is expressly incorporated herein by reference in its entirety.

BACKGROUND OF THE INVENTION

1. Field of the Invention

The present invention relates to a technique to generate a character image in which multiple characters, including a player character, a three-dimensional character drawn by three-dimensional polygon data and a two-dimensional character drawn by two-dimensional sprite data, are drawn in a virtual three-dimensional space, the character image being used for displaying a conversation field in which the player character is allowed to have a conversation with other character.

2. Description of the Related Art

When characters including three-dimensional objects are drawn in a virtual three-dimensional space in a personal computer, a video game machine or the like, the three-dimensional objects are generally drawn by three-dimensional polygon data. The three-dimensional polygon data are respectively generated by executing polygon calculations in accordance with a distance between each of the three-dimensional objects in a field of view of a virtual camera and a viewpoint position of the virtual camera or the like.

Further, in various kinds of so-called role playing games (RPG; that is, a video game in which a player plays a role of a character in a world of the video game, and accomplishes a predetermined object while enjoying a process that the character grows through various experiences, a conversation field in which the player character executes an action, such as information gathering by obtaining information by means of inquiry and purchase of items, by having a conversation with other characters in the RPG is generally provided.

It is desired that a large number of characters corresponding to the information obtained by inquiry appear in the conversation field. For this reason, for example, the conversation field may be set to a place such as a market and an open space where a lot of characters (people) gather.

In this regard, in order to reduce the processing load of hardware without omitting objects to be displayed on the virtual three-dimensional space, there is a known process in which all objects are not drawn by three-dimensional polygon data when a lot of objects are to be displayed on the virtual three-dimensional space. Some of the objects that are apart from the viewpoint position of the virtual camera by a predetermined distance or more are drawn by two-dimensional sprite data (for example, see Japanese Patent Application Publication No. 2003-141560).

As described above, a lot of characters are displayed in the conversation field. As the number of three-dimensional objects drawn in the virtual three-dimensional space becomes larger, the amount of polygon calculations increases. Thus, there is a fear that throughput exceeds computing power of hardware such as a personal computer and a video game machine in the case where a large number of three-dimensional objects are to be drawn in the virtual three-dimensional space. In the case where such throughput exceeds the computing power, negative effects such as reduced display speed and screen flicker may occur. Therefore, since the number of characters that can be displayed in one scene, there is a problem that realism (realistic sensation) may be lost in the RPG.

Further, it is thought that a part of objects that is apart from the viewpoint position of the virtual camera by the predetermined distance or more is drawn by two-dimensional sprite data as the patent document mentioned above. However, in the case where a crowded place such as a market and an open space is set to a conversation field, a lot of characters must be drawn even in a place that is not apart from the viewpoint position of the virtual camera by the predetermined distance or more. Thus, there is a problem that realism (realistic sensation) may be lost in the RPG.

SUMMARY OF THE INVENTION

It is one object of the present invention to provide a method, an apparatus and a computer program product for generating an image by which it is possible to solve the problems as described above, and to generate and display a character image having realism (realistic sensation), in which a lot of characters are displayed as a virtual three-dimensional space without increasing processing load of hardware, in a conversation field of a video game such as a RPG.

Figure 4:
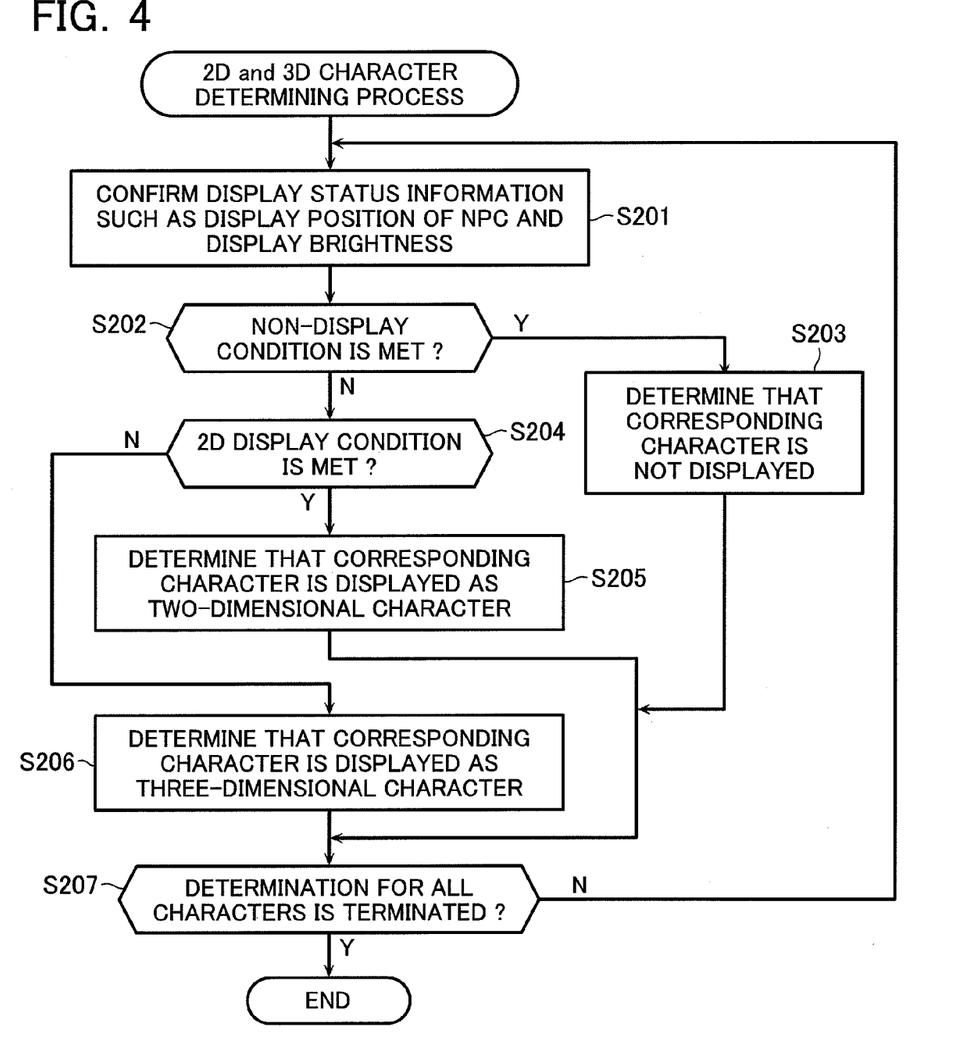
FIG. 4 is a flowchart that illustrates an example of a 2D and 3D character determining process.

In order to achieve the above object, in one aspect of the present invention, the present invention is directed to a method of generating a character image in which multiple characters, including a player character, a three-dimensional character drawn by three-dimensional polygon data and a two-dimensional character drawn by two-dimensional sprite data, are drawn in a virtual three-dimensional space. In this case, the character image is used for displaying a conversation field in which the player character is allowed to have a conversation with other character. The method according to one embodiment of the present invention includes determining that a character satisfying a predefined non-display condition is not drawn in the virtual three-dimensional space among characters positioned in a field of view of a virtual camera (for example, processes at Steps S202 and S203).

The method may also include drawing a character that satisfies a predetermined two-dimensional display condition as a two-dimensional character among the characters positioned in the field of view of the virtual camera (for example, processes at Steps S204 and S205).

The method may also include drawing a character that does not satisfy the two-dimensional display condition as a three-dimensional character among the characters positioned in the field of view of the virtual camera (for example, processes at Steps S204 and S206).

Since the method of the present invention may have the steps as described above, it is possible to generate and display a character image having realism (realistic sensation), in which a lot of characters are displayed as a virtual three-dimensional space without increasing processing load of hardware, in a conversation field of a video game such as a RPG.

It is preferable that the two-dimensional display condition is satisfied in the case where the amount of luminance when displaying the character is a predetermined value or less. By constituting the method of the present invention in this way, for example, it is possible to display a character to be displayed as a two-dimensional character at a relatively dark place where there is no uncomfortable feeling to the eye even when the character is displayed as a two-dimensional character. This makes it possible to reduce processing load of hardware without losing realism (realistic sensation).

It is preferable that the two-dimensional display condition is satisfied in the case where the character is apart from the player character by a predefined three-dimensional display distance or more. By constituting the method of the present invention in this way, for example, it is possible to display a character to be displayed as a two-dimensional character at a distant place from the player character where there is no uncomfortable feeling to the eye even when the character is displayed small as a two-dimensional character. This makes it possible to reduce processing load of hardware without losing realism (realistic sensation).

It is preferable that the non-display condition is satisfied in the case where the character is apart from the player character by a predefined non-display distance or more in which the non-display distance is longer than the three-dimensional display distance. By constituting the method of the present invention in this way, for example, no character in which there is no uncomfortable feeling to the eye even when the character is not displayed can be displayed. This makes it possible to reduce processing load of hardware without losing realism (realistic sensation).

It is preferable that the two-dimensional character drawn in the character image includes a character that is allowed to have a conversation with the player character. By constituting the method of the present invention in this way, it is possible to increase the number of conversation allowable characters.

It is preferable that the method further includes displaying a conversation allowable character arrangement map in which the player can recognize a display position of the character that is allowed to have a conversation with the player character among the characters drawn in the character image. By constituting the method of the present invention in this way, the player can easily grasp the position of the conversation allowable character.

It is preferable that the method further includes displaying a conversation allowable mark in the vicinity of the character that is allowed to have a conversation with the player character among the characters drawn in the character image, the conversation allowable mark indicating that the character is allowed to have a conversation with the player character. By constituting the method of the present invention in this way, the player can easily grasp the conversation allowable character.

It is preferable that the method further includes: receiving selection of one character among the characters in the vicinity of which the conversation allowable mark is displayed; executing a movement control process in which the player character is caused to move to the vicinity of the received one character; and executing a reply control process in which the one character is caused to reply to a conversation request from the player character by considering that the conversation is requested of the one character when the movement is terminated. By constituting the method of the present invention in this way, the player character can easily execute a conversation with a character that is positioned distant.

Figure 1:
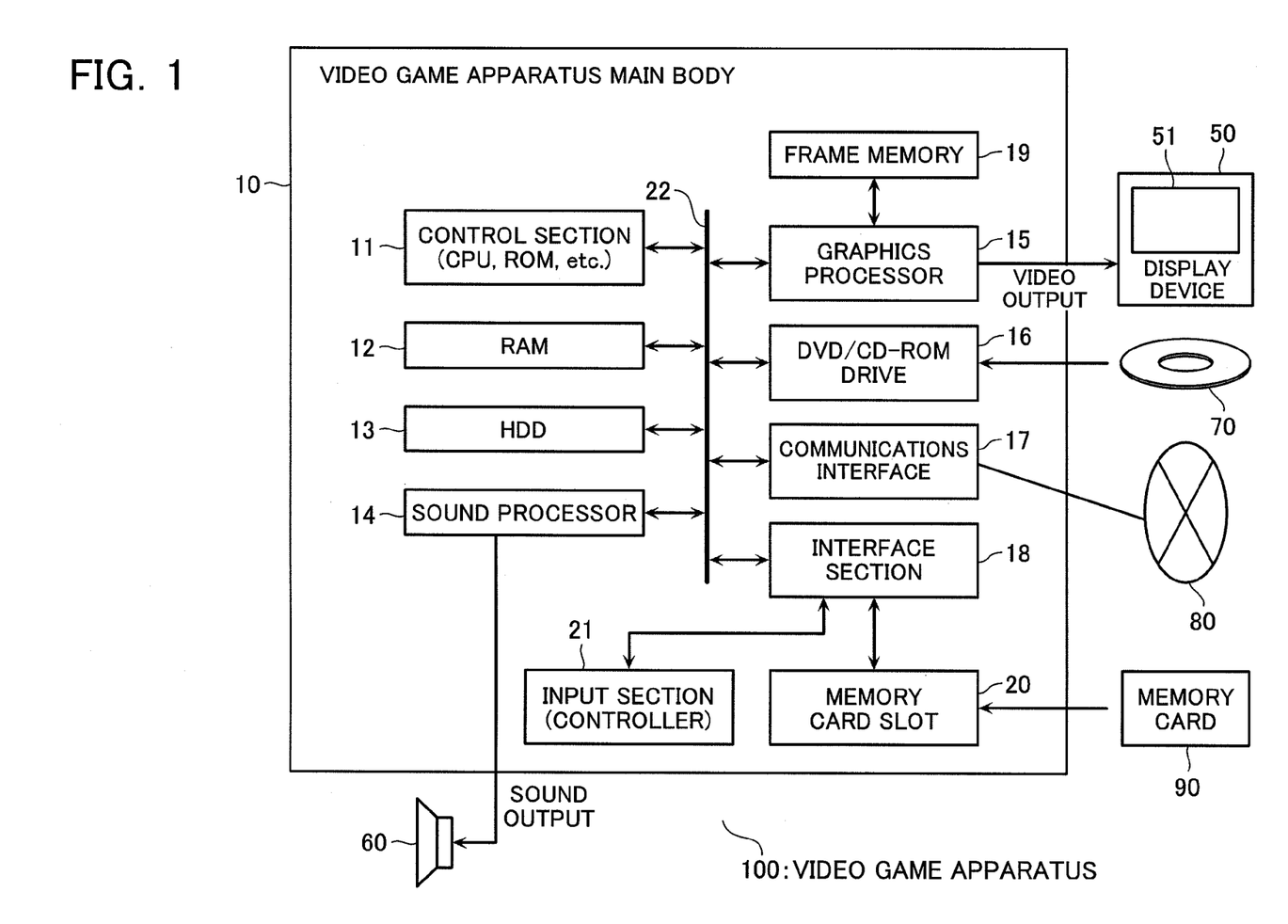
FIG. 1 is a block diagram that illustrates an example of a configuration of a video game apparatus to which an embodiment of the present invention is applied.

Further, in another aspect of the present invention, the present invention is directed to an image generating apparatus (for example, a video game apparatus 100 and a video game apparatus main body 10) for generating a character image in which multiple characters, including a player character, a three-dimensional character drawn by three-dimensional polygon data and a two-dimensional character drawn by two-dimensional sprite data, are drawn in a virtual three-dimensional space. In this case, the character image is used for displaying a conversation field in which the player character is allowed to have a conversation with other character. The image generating apparatus according to one embodiment of the present invention includes a non-display condition determiner that determines that a character satisfying a predefined non-display condition is not drawn in the virtual three-dimensional space among characters positioned in a field of view of a virtual camera (for example, a portion in a control section 11 that executes the process at Steps S202 and S203).

The image generating apparatus may also include a two-dimensional character drawer that draws a character that satisfies a predetermined two-dimensional display condition as a two-dimensional character among the characters positioned in the field of view of the virtual camera (for example, a portion in a control section 11 that executes the process at Steps S204 and S205).

The image generating apparatus may also include a three-dimensional character drawer that draws a character that does not satisfy the two-dimensional display condition as a three-dimensional character among the characters positioned in the field of view of the virtual camera (for example, a portion in a control section 11 that executes the process at Steps S204 and S206).

Since the image generating apparatus of the present invention may have the steps as described above, it is possible to generate and display a character image having realism (realistic sensation), in which a lot of characters are displayed as a virtual three-dimensional space without increasing processing load of hardware, in a conversation field of a video game such as a RPG.

Moreover, still another aspect of the present invention is directed to a computer program product for generating a character image in which multiple characters, including a player character, a three-dimensional character drawn by three-dimensional polygon data and a two-dimensional character drawn by two-dimensional sprite data, are drawn in a virtual three-dimensional space. In this case, the character image is used for displaying a conversation field in which the player character is allowed to have a conversation with other character. The computer program product causes a computer (for example, the video game apparatus main body 10, and video game apparatus 100 or a control section 11) to execute steps including determining that a character satisfying a predefined non-display condition is not drawn in the virtual three-dimensional space among characters positioned in a field of view of a virtual camera (for example, Steps S202 and S203).

The steps may also include drawing a character that satisfies a predetermined two-dimensional display condition as a two-dimensional character among the characters positioned in the field of view of the virtual camera (for example, Steps S204 and S205).

The steps may also include drawing a character that does not satisfy the two-dimensional display condition as a three-dimensional character among the characters positioned in the field of view of the virtual camera (for example, Steps S204 and S206).

Since the computer program product of the present invention may have the steps as described above, it is possible to generate and display a character image having realism (realistic sensation), in which a lot of characters are displayed as a virtual three-dimensional space without increasing processing load of hardware, in a conversation field of a video game such as a RPG.

According to an aspect of the present invention, it is possible to generate and display a character image having realism (realistic sensation), in which a lot of characters are displayed as a virtual three-dimensional space without increasing processing load of hardware, in a conversation field of a video game such as a RPG.

BRIEF DESCRIPTION OF THE DRAWINGS

The foregoing and other objects, features and advantages of the present invention will become more readily apparent from the following detailed description of preferred embodiments of the present invention that proceeds with reference to the appending drawings.

DETAILED DESCRIPTION OF THE INVENTION

Preferred embodiments of a video game processing apparatus, a method and a computer program product for processing a video game according to the present invention will be described in detail with reference to the appending drawings.

FIG. 1 is a block diagram that illustrates a configuration of a video game apparatus 100 to which an embodiment of the present invention is applied. However, those skilled in the art will readily recognize that other devices may be used without departing from the spirit or scope of the present invention.

As shown in FIG. 1, a video game apparatus 100 of the present embodiment includes a video game apparatus main body 10, a display device 50, and a sound output device 60. The video game apparatus main body 10 is constituted from a video game system that is put on the market, for example. Further, the display device 50 is constituted from, for example, a television apparatus, a liquid crystal display device, a micro-mirror device, a holographic display device, or any combination thereof. The display device 50 is provided with an image display screen 51. However, those skilled in the art will readily recognize that any device capable of generating or reproducing an image may be used without departing from the scope or spirit of the present invention.

The video game apparatus main body 10 includes a control section 11, a RAM (Random Access Memory) 12, a HDD (hard disk drive) 13, a sound processor 14, a graphics processor 15, a DVD/CD-ROM drive 16, a communications interface 17, an interface section 18, a frame memory 19, a memory card slot 20, and an input section (controller) 21.

Each of the control section 11, the RAM (Random Access Memory) 12, the HDD (Hard Disk Drive) 13, the sound processor 14, the graphics processor 15, the DVD/CD-ROM drive 16, the communications interface 17 and the interface section 18 is connected to an internal bus 22.

The control section 11 includes a CPU (Central Processing Unit), ROM (Read Only Memory) and the like, and executes control of the whole video game apparatus 100 in accordance with control programs stored in the HDD 13 and/or a storage medium 70. The control section 11 includes an internal timer used to generate timer interruption. The RAM 12 may be used as a work area for the control section 11. The HDD 13 is a storage area for storing the control programs and various data.

The sound processor 14 is connected to a sound output device 60, which includes a speaker, for example, but may include any other device capable of generating or reproducing an audible signal. The sound processor 14 outputs a sound signal to the sound output device 60 in accordance with a sound outputting command from the control section 11 that executes a process according to the control programs. In this regard, the sound output device 60 may be embedded in the display device 50 or the video game apparatus main body 10, or may be affixed to a vibrating surface that may be caused to generate the audible signal.

The graphics processor 15 is connected to the display device 50 including the image display screen 51 on which an image is displayed. However, those skilled in the art will readily recognize that the graphics processor may be coupled to other known types of display devices, such as a head-mounted display, a holographic three-dimensional display or the like, without departing from the spirit or scope of the present invention. The graphics processor 15 develops an image on the frame memory 19 in accordance with a drawing or graphics command from the control section 11, and outputs video signals for displaying the image on the image display screen 51 to the display device 50. A switching time for images to be displayed according to the video signals is set to 1/30 seconds per frame (for NTSC type displays), for example. However, the switching time may be any other frame rate (for example, 1/25 second per frame (for PAL type displays)) as those skilled in the art will appreciate without departing from the spirit or scope of the present invention.

A storage medium 70 such as a DVD-ROM medium or a CD-ROM medium, or equivalent, in which control programs for a video game are stored is mounted in the DVD/CD-ROM drive 16. The DVD/CD-ROM drive 16 executes a process for reading out various data such as control programs from the storage medium 70.

The communications interface 17 is connected to a communication network 80 such as the Internet, a local area network (LAN), a wide area network (WAN), or the like, in a wireless or wired manner. The video game apparatus main body 10 carries out communication with, for example, another computer via the communication network 80 using a communication function of the communications interface 17.

Each of the input section 21 and the memory card slot 20 is connected to the interface section 18. The interface section 18 causes the RAM 12 to store instruction data from the input section 21 on the basis of operation(s) of the input section 21 by a player of the video game apparatus 100. In response to the instruction data stored in the RAM 12, the control section 11 executes various arithmetic processing.

The input section 21 is constituted from, for example, a controller for a video game apparatus 100, and includes multiple operational buttons (operational keys) such as a directional instruction key. In the present embodiment, when a player (that is, a user of the video game apparatus 100) operates the directional instruction key, a player character (to be described later) is virtually moved. Further, operation of other various operational keys by the player causes the control section 11 to execute a predetermined process according to the scene displayed on the image display screen 51. In this regard, the directional instruction key is used to move a cursor and the like.

Further, the interface section 18 executes, according to command(s) from the control section 11, a process to store data indicative of the progress of a video game stored in the RAM 12 into the memory card 90 installed in the memory card slot 20. The interface section 18 also executes a process to read out data on a video game stored in the memory card 90 at the time of suspending the video game and to transfer such data to the RAM 12, and the like.

Various data, such as control program data for executing the video game with the video game apparatus 100, are stored in, for example, the storage medium 70. The various data, such as the control program data stored in the storage medium 70, are read out by the DVD/CD-ROM drive 16 in which the storage medium 70 is installed, and the data thus read out are loaded onto the RAM 12. The control section 11 executes, in accordance with the control program loaded on the RAM 12, various processes such as a process to output the drawing or graphics command to the graphics processor 15, and a process to output the sound outputting command to the sound processor 14. In this regard, the interim data generated in response to the progress of the video game (for example, data indicative of scoring of the video game, the state of a player character and the like) are stored in the RAM 12 used for a work memory while the control section 11 executes processing.

It is assumed that a three-dimensional video game according to an aspect of the present embodiment is a video game wherein multiple characters, including a player character (that is, a character that moves in accordance with the operation of the input section 21 by the player, which will be described later), move on a field provided in a virtual three-dimensional space, by which the video game proceeds. In this regard, it is assumed that the virtual three-dimensional space in which the field is formed is indicated by coordinates of the world coordinate system. The field is defined by multiple surfaces, and coordinates of vertexes of the respective constituent surfaces are shown as characteristic points.

Figure 2:
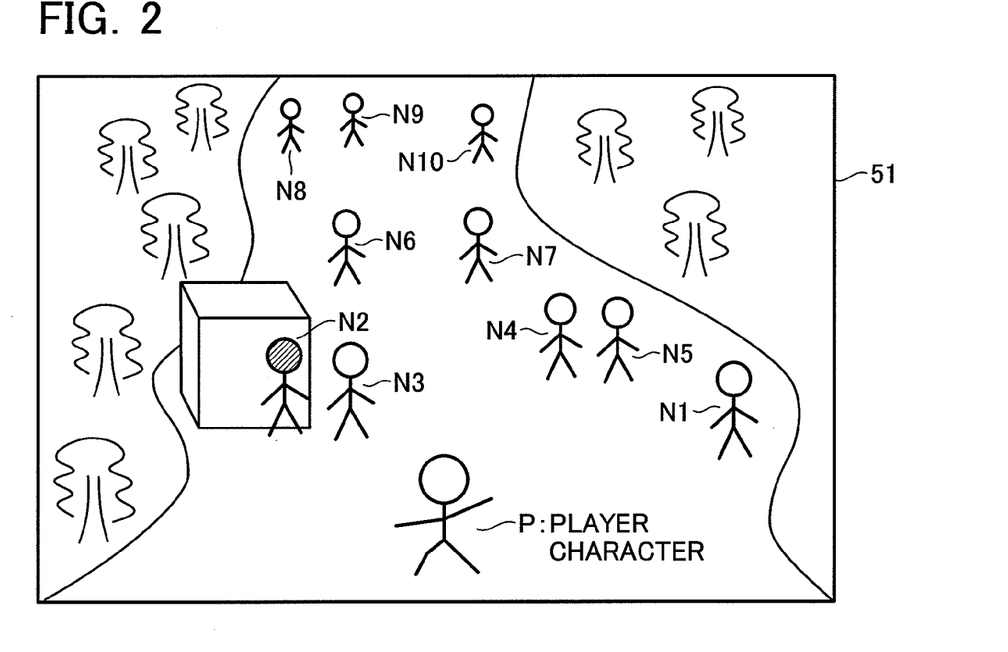
FIG. 2 is an explanatory drawing that shows an example of a character image displayed in an image display screen.

FIG. 2 is an explanatory drawing that shows an example of a character image displayed in the image display screen 51 on the three-dimensional video game according to the present embodiment. A player character P and multiple non-player characters (which are moved in accordance with control of the video game apparatus 100 (more specifically, control of the control section 11), and hereinafter, also referred to simply as "NPC") are displayed in the character image illustrated in FIG. 2.

The character image shown in FIG. 2 is an example of an image that indicates a conversation field in which the player character is allowed to have a conversation with a non-player character and to acquire items and/or to gather information in the RPG. The conversation field is a field in which the player character may purchase items by having a conversation with, for example, a shop staff that is a non-player character and/or gather information by having a conversation with, for example, a foot passenger that is a non-player character. The conversation field is expressed by means of a state of a city (downtown), a house, the inside of a castle, a market and the like.

In order to simplify the illustration in FIG. 2, the player character P and each of non-player characters N1 to N10 are shown by a simple humanoid shape. The player character P and the respective non-player characters N1 to N10 are actually shown as characters that imitate a human and/or an animal, for example, and characters formed as objects such as a vehicle.

Each part forming the player character P is constituted from multiple polygons, and the characteristic points (vertexes of the respective polygons) are indicated by coordinates of the local coordinate system. Namely, the player character P is a three-dimensional character drawn by three-dimensional polygon data.

As illustrated in FIG. 2, the player character P is shown at a lower portion of the central position in the image display screen 51 in the present embodiment. In this case, the player character P may be movable within a predetermined range of the lower portion of the central position in the image display screen 51. In the present embodiment, the player character P is constituted not to be moved to an upper side from a predetermined position of the lower portion of the central position in the image display screen 51. The position of each of the vertexes of each polygon constituting the player character P is defined by identifying the positional relationship of each of the characteristic points by the local coordinate system and transferring the coordinates of the characteristic points to the coordinates of the world coordinate system.

Five non-player characters N3 to N7 among the multiple non-player characters illustrated in FIG. 2 are three-dimensional characters drawn by three-dimensional polygon data as well as the player character P. On the other hand, the non-player characters other than the non-player characters N3 to N7 are two-dimensional characters drawn by two-dimensional sprite data. In other words, the multiple non-player characters displayed in the character image illustrated in FIG. 2 are constituted from three-dimensional characters (non-player characters N3 to N7) and two-dimensional characters (non-player characters other than the non-player characters N3 to N7).

In the present embodiment, each of the non-player characters N2 to N10 is moved in accordance with the progress of the video game in response to the control program. Namely, even when the player character P is not moved, one or more non-player character is moved on the character image in response to the control program. In this regard, in the present embodiment, the non-player character N1 does not execute an action such as movement.

Further, each of the non-player characters may newly appear on the character image from the outside of the character image, disappear from the character image, and be moved to the outside of the character image. Moreover, each of the non-player characters may have the same shape as each other. Alternatively, a part or all of the non-player characters may have different shapes, respectively.

The image in which the player character P and/or the multiple non-player characters are moved on the field in the virtual three-dimensional space is displayed on the image display screen 51 by perspective-transforming the virtual three-dimensional space by means of the virtual camera, whereby the player of the video game recognizes such an image. The image projected on a virtual screen from the virtual camera positioned in the virtual three-dimensional space becomes the image displayed on the image display screen 51. A viewpoint coordinate system is used to project an image on the virtual screen. For this reason, the coordinates of the world coordinate system are to be transformed to the coordinates of the viewpoint coordinate system.

In the case where an image projected on the virtual screen is generated by means of the perspective transformation, there is a need to execute hidden surface removal method in which a surface of the object hidden by another object placed in the front thereof is removed. In the present embodiment, a Z buffer method is used as the hidden surface removal method. Namely, when the control section 11 transforms the coordinates of the world coordinate system to the coordinates of the viewpoint coordinate system, the control section 11 informs the graphics processor 15 of the coordinates of the respective characteristic points and outputs the drawing command thereto. On the basis of this drawing command, the graphics processor 15 updates the content of the Z buffer so that data on the points that reside at the front side are retained with respect to the respective characteristic points, and develops the image data on the characteristic points on the frame memory 19 for every update.

Next, operation of the video game apparatus 100 according to the present embodiment will now be described.

Here, in order to simplify the explanation, it is assumed that a single player character P and multiple non-player characters exist as characters (which includes objects that are movable and objects that maintain a stationary state) to be displayed in the virtual three-dimensional space. Further, the explanation for any process other than the processes relating to the present invention is omitted, in particular.

Figure 3:
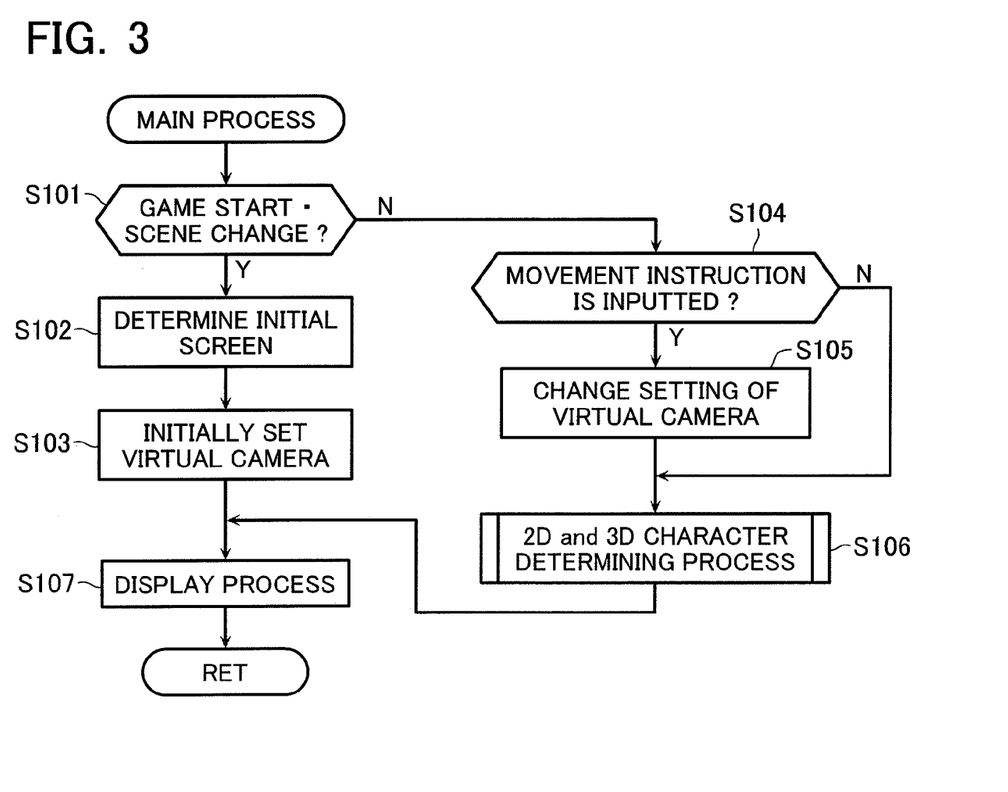
FIG. 3 is a flowchart that illustrates an example of a main process.

FIG. 3 is a flowchart that illustrates an example of a main process of the video game apparatus 100 according to the present embodiment. The main process is a process for generating an image for one frame, and is executed in accordance with timer interruption at every 1/30 second. However, it is to be noted that timing of "at every 1/30 second" is only one example, as mentioned above. For example, the main process may be executed in accordance with timer interruption at every single field period (every 1/60 second) or at every two frame periods (every 1/15 second).

In the main process, the control section 11 determines whether an instruction to start a video game is generated through an operation of the input section 21 by means of the player or not in the case where the state is still before the video game start. Alternatively, once the video game is in an execution state, the control section 11 determines whether a timing state is reached to change the scene (for example, change the field) or not (Step S101). The timing state to change the scene means, for example, timing at which a virtual three-dimensional space illustrating a new scene is displayed on the image display screen 51 in order to finish the scene that has been displayed on the image display screen 51 until that point (for example, a scene displayed by a virtual three-dimensional space, and a scene displayed by a directorial moving image) and to switch the displayed scene to the new scene.

In the case where it is determined that the instruction to start the video game is generated or that the timing state reaches a state to change the scene ("Yes" at Step S101), the control section 11 determines an initial screen (an initial screen shown at the time of start of the video game, or an initial screen shown at the time of change in the scene) in accordance with the control program (Step S102). In this case, various data such as image data used for the video game and characters are stored in the storage medium 70. At Step S102, the position of the player character P to be displayed, the type and the number of non-player characters to be displayed as a two-dimensional character (hereinafter, referred to as a "two-dimensional non-player character"), the type and the number of non-player characters to be displayed as a three-dimensional character (hereinafter, referred to as a "three-dimensional non-player character"), the position of each of the non-player characters to be displayed, and the like are determined in accordance with the control program. In this case, the number of three-dimensional non-player characters is determined so as to be a predetermined 3D upper limit number or less (for example, 10, 15, 20 or 32 pieces). In the present embodiment, for example, the screen as illustrated in FIG. 2 is determined as an initial screen.

Subsequently, the control section 11 determines a viewpoint position of a virtual camera, a direction of a visual axis, and a size of a visual angle in accordance with the control program. The control section 11 executes an initial setup for the virtual camera to execute perspective transformation (Step S103). Then, the processing flow proceeds to Step S107.

On the other hand, in the case where it is determined that the video game is executed and it is not time to change the scene ("No" at Step S101), the control section 11 determines whether or not instruction data to cause the player character P to move are inputted from the input section 21 by the operation of the player (Step S104).

In the case where it is determined that the instruction data to cause the player character P to move are inputted, the control section 11 updates necessary data among data on the viewpoint position of the virtual camera, data on the direction of the visual axis, and data on the size of the visual angle in accordance with the content of the instruction data from the input section 21. The control section 11 thereby changes the setting content of the virtual camera (Step S105).

Subsequently, the control section 11 executes a 2D and 3D character determining process (will be described later) for determining a display status and the like of each of the non-player characters (Step S106).

The control section 11 perspectively transforms the virtual three-dimensional space including the player character P and the non-player characters to be displayed from the virtual camera onto the virtual screen in accordance with the setting content of the virtual camera. The control section then executes a display process to generate a two-dimensional image to be displayed on the image display screen 51 (Step S107). When the display process is terminated, this main process is also terminated. Then, when timer interruption is generated at a timing state to start a next frame period, a next main process is to be executed (that is, the main process is repeated). By repeatedly executing the main process, a character image is switched every frame period, and a moving image (animation) is displayed on the image display screen 51.

Now, the display process at Step S107 will be briefly described. At Step S107, the control section 11 first transforms at least the coordinates of the vertexes of respective polygons included within a range to be perspectively transformed on the virtual screen among the coordinates of the vertexes of polygons constituting the virtual three-dimensional space, in which the player character P, the two-dimensional non-player characters and the three-dimensional non-player characters are included, from the coordinates of the world coordinate system to the coordinates of the viewpoint coordinate system. Further, the control section 11 generates, in accordance with processing results of the 2D and 3D character determining process, 2D display command information (for example, information including the type of two-dimensional non-player character, a display position on the viewpoint coordinate system, the enlarging or contracting ratio of a sprite image, a rotation angle of the sprite image) required to display the two-dimensional non-player character on the virtual three-dimensional space. Subsequently, the control section 11 transmits the coordinates of the vertexes of polygons of the player character P and the three-dimensional non-player characters in the viewpoint coordinate system and the 2D display command information for the two-dimensional non-player characters to the graphics processor 15, thereby outputting a drawing command to the graphics processor 15.

When the drawing command is inputted, the graphics processor 15 updates, on the basis of the coordinates of the viewpoint coordinate system, the content of the Z buffer so that data on the points that reside at the front side are retained with respect to points constituting each surface. When the content of the Z buffer is updated, the graphics processor 15 develops image data on the points that reside at the front side on the frame memory 19. Further, the graphics processor 15 executes some processes such as a shading process and a texture mapping process with respect to the developed image data.

Then, the graphics processor 15 in turn reads out the image data developed on the frame memory 19, and generates video signals by adding a sync signal to the image data to output the video signals to the display device 50. The display device 50 displays an image corresponding to the video signals outputted from the graphics processor 15 on the image display screen 51. By switching images displayed on the image display screen 51 every single frame period, the player can see images including the situation in which the player character and/or the non-player characters are moved on the field.

Figure 5:
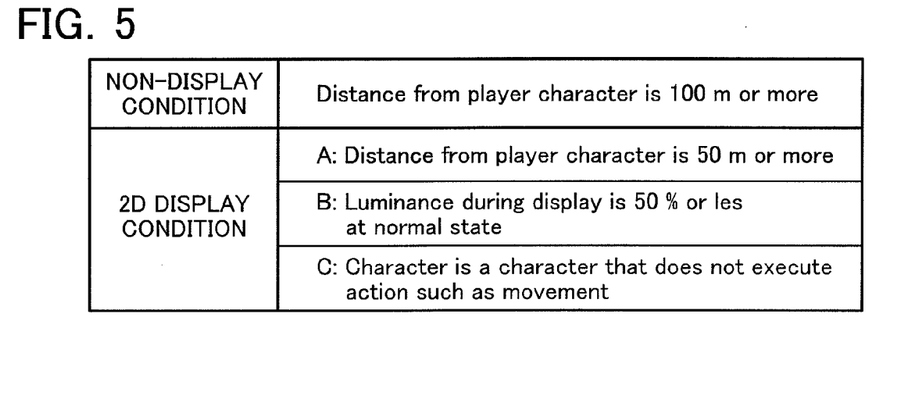
FIG. 5 is an explanatory drawing that shows a concrete example of a non-display condition and a 2D display condition.

FIG. 4 is a flowchart that illustrates an example of the 2D and 3D character determining process (Step S106). FIG. 5 is an explanatory drawing that shows a concrete example of a non-display condition and a 2D display condition.

In the 2D and 3D character determining process, the control section 11 selects one non-player character, which is a target to determine a display status thereof, among non-player characters positioned within the virtual three-dimensional space. The control section 11 then confirms the content of information on a display status that indicates a display status of the selected non-player character such as a display position thereof and display brightness thereof (Step S201). The display status information is constituted from data that change in accordance with a progress status of the video game. The display status information is stored in the RAM 12, for example.

When the content of the display status information is confirmed, the control section 11 determines whether the display status of the non-player character indicated by the display status information satisfies (or meets) a non-display condition or not (Step S202). In the case where it is determined that the display status satisfies the non-display condition, the control section 11 determines that the non-player character that is a target to determine the display status is not displayed on the image display screen 51 (Step S203).

The "non-display condition" is a condition to determine whether the corresponding non-player character is displayed or not. The "non-display condition" is defined in advance. More specifically, for example, as shown in FIG. 5, the "non-display condition" is set to a condition that a distance from the player character is a distance corresponding to 100 (m) in a real space or more. It is noted that 100 (m) in the real space is just one example. As long as the set distance is a distance to the extent that there is no uncomfortable feeling even in the case where the non-player character is not displayed, the set distance may be set to other distance such as 90 (m) or 110 (m) in the real space, for example.

In the case where it is determined that the display status does not satisfy the non-display condition, the control section 11 determines whether or not the display status of the non-player indicated by the display status information satisfies (or meets) a 2D display condition (Step S204). In the case where it is determined that the display status satisfies the 2D display condition, the control section 11 determines that the non-player character that is a target to determine the display status is 2D-displayed (that is, displayed as a two-dimensional character) on the image display screen 51 (Step S205). On the other hand, in the case where it is determined that the display status does not satisfy the 2D display condition, the control section 11 determines that the non-player character that is a target to determine the display status is 3D-displayed (that is, displayed as a three-dimensional character) on the image display screen 51 (Step S206).

The "2D display condition" is a condition to determine whether the corresponding non-player character is displayed as a two-dimensional character or not. In the present embodiment, for example, as shown in FIG. 5, three kinds of conditions including a condition "A" to a condition "C" are defined as the "2D display condition" in advance. In the present embodiment, in the case where at least one condition is satisfied among the three kinds of conditions including the condition "A" to the condition "C", it is determined that the "2D display condition" is satisfied.

As shown in FIG. 5, the 2D condition "A" is a condition that a distance from the player character is a distance corresponding to 50 (m) in a real space or more. It is noted that 50 (m) in the real space is just one example. As long as the set distance is a nearer distance than the distance defined in the "non-display condition", the set distance may be set to other distance such as 45 (m) or 55 (m) in the real space, for example.

Further, as shown in FIG. 5, the 2D condition "B" is a condition that luminance when the non-player character that is a target to determine the display status is displayed is 50% at a normal state or less. The luminance at the normal state corresponds to display luminance of the player character P. Namely, a non-player character displayed at a dark place whose brightness is low is determined to be displayed as a two-dimensional character. It is noted that the "50% at the normal state" defined as a ratio of the amount of luminance is just one example. The luminance may be other ratio of the amount of luminance.

Data referred to as a "color value map" is used for adjusting luminance of a character (non-player character). Luminance when the character is displayed is determined using display coordinates of the character and the color value map. For example, in the case where the character is illuminated by means of a red light to the eye, a red color is set to the color value map in the coordinates at which the character is positioned. When the character is displayed, the red color set to the color value map is reflected. Thus, the character is displayed with a color so as to be illuminated by means of the red light.

Moreover, as shown in FIG. 5, the 2D condition "C" is a condition that the non-player character is a character that does not execute an action such as movement. Namely, a character that does not execute an action even when the video game proceeds and maintains a stationary state is determined to be displayed as a two-dimensional character. In this regard, such a character is displayed as a background character to display a lot of characters when a crowded place such as a market and a city (downtown) is displayed as a conversation field. In this case, since the background character is normally treated as a background on the control, the player character cannot have a conversation with the background character.

When the display status of the selected one non-player character that is a target to determine the display status is determined, the control section 11 confirms whether or not a display status of each of all the characters is determined (determination for all the characters is terminated) (Step S207). In the case where there is any non-player character whose display status is not determined (that is, the determination for all the characters is not terminated), the processing flow returns to Step S201 to determine a display status of each of the remaining non-player characters.

On the other hand, in the case where the display status of each of all the characters is determined, the control section 11 terminates the 2D and 3D character determining process.

Figure 6:
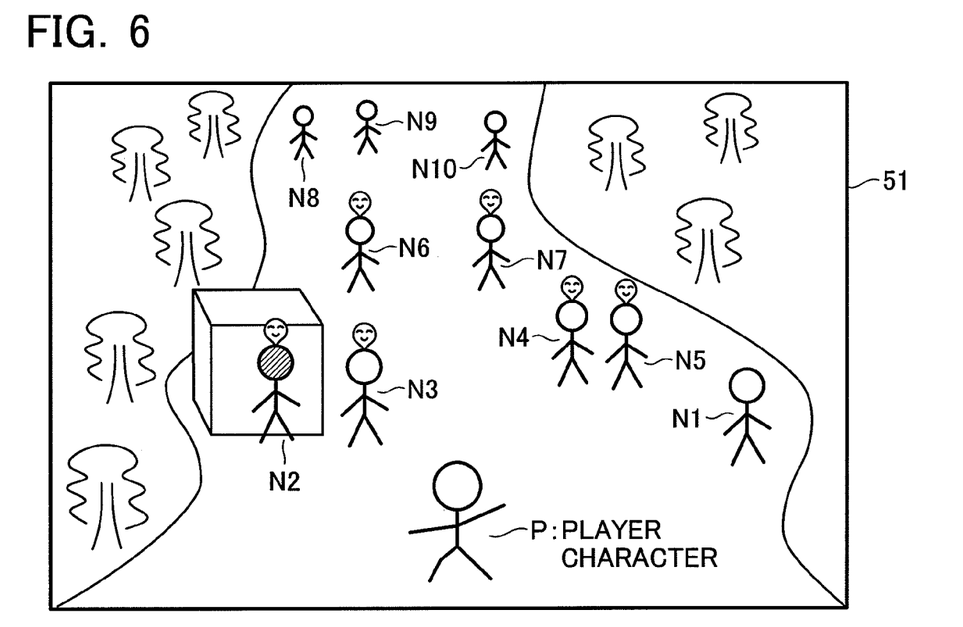
FIG. 6 is an explanatory drawing that shows an example of a character image in which a conversation allowable mark displayed in the image display screen is included.
Figure 7:
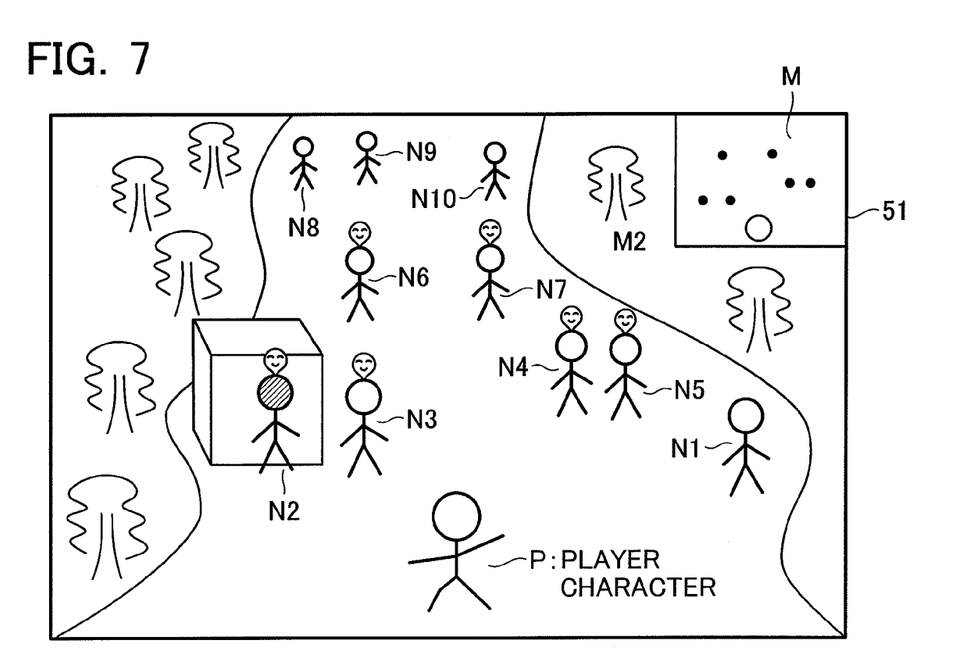
FIG. 7 is an explanatory drawing that shows an example of a character image in which a conversation allowable character arrangement map displayed in the image display screen is included.

Next, the display status of the character image displayed on the image display screen 51 by means of image display control by repeatedly executing the main process in the video game apparatus 100 of the present embodiment will be described concretely. FIG. 6 is an explanatory drawing that shows an example of a character image in which a conversation allowable mark displayed in the image display screen 51 is included. FIG. 7 is an explanatory drawing that shows an example of a character image in which a conversation allowable character arrangement map displayed in the image display screen 51 is included.

Here, in order to simplify the explanation, the case where the player character P is moved to the back side of the virtual three-dimensional space displayed on the image display screen 51 when ten two-dimensional non-player character N1 to N10 are displayed as illustrated in FIG. 6 will be described as an example.

In this regard, in the display status shown in FIG. 6, among the respective non-player characters N1 to N10, a non-player character N1 is a character that satisfies the 2D display condition C; a non-player character N2 is a character that satisfies the 2D display condition B; and each of non-player characters N8 to N10 is a character that satisfies the 2D display condition A. In this case, each of the other non-player characters N3 to N7 does not satisfy any of the 2D display conditions A to C.

Thus, in the example shown in FIG. 6, among the respective non-player characters N1 to N10, the non-player character N1, the non-player character N2 and the non-player characters N8 to N10 are displayed as a two-dimensional character, while the other non-player characters N3 to N7 are displayed as a three-dimensional character.

In the present embodiment, as shown in FIG. 6, in order to allow the player to recognize conversation allowable non-player characters, a conversation allowable mark (a speech balloon from a face of each of the non-player characters in FIG. 6) indicating that the player character P can have a conversation with the corresponding non-player character is displayed in the vicinity of the non-player character with which the player character P can have a conversation among the respective non-player characters whose distance from the player character P is nearer than a predetermined distance (for example, a distance corresponding to 50 (m) in the real space). Namely, the control section 11 confirms whether there is a non-player character that is positioned within the predetermined distance from the player character P or not whenever the position of the player character P is caused to move in response to operations of the input section 21 by the player or the position of any non-player character is moved. In the case where it is confirmed that there is such a non-player character, the control section 11 confirms whether the non-player character is a conversation allowable character or not. In the case where it is then confirmed that the non-player character is a conversation allowable character, the control section 11 causes the display device 50 to display a conversation allowable mark in the vicinity of the non-player character.

Therefore, the player character P is caused to move to the back side of the virtual three-dimensional space in response to the operations of the input section 21 by the player when the image shown in FIG. 6 is displayed. In this case, in the case where a non-player character that is to be positioned within the predetermined distance from the player character P is a conversation allowable character, a conversation allowable mark appears in the vicinity of the non-player character.

In this regard, when there is a request to display a conversation allowable mark in accordance with operations of the input section 21 by the player, the control section 11 may execute a control process to cause the display device 50 to display the conversation allowable mark.

As explained above, in the embodiment described above, the video game apparatus 100 is constructed so that a character image is displayed as an image indicating a conversation field. In the character image, among non-player characters positioned within the field of view of the virtual camera, a non-player character that satisfies the non-display condition defined in advance is not drawn; a character that satisfies the 2D display condition defined in advance is drawn as a two-dimensional character in the virtual three-dimensional space; and a character that does not satisfy the 2D display condition is drawn as a three-dimensional character in the virtual three-dimensional space. Thus, it is possible to generate and display a character image that indicates a conversation field having realism (realistic sensation), in which a lot of characters are displayed as a virtual three-dimensional space without increasing processing load of hardware, in a conversation field of a video game such as a RPG.

Namely, since the non-player character that satisfies the non-display condition is not drawn in the virtual three-dimensional space, no non-player character in which there is no uncomfortable feeling even when the non-player character is not displayed can be displayed. This makes it possible to reduce processing load of hardware without losing realism (realistic sensation).

Further, the video game apparatus 100 is constructed so that a non-player character satisfying the 2D display condition defined in advance is drawn in the virtual three-dimensional space as a two-dimensional character, and a non-player character not satisfying the 2D display condition defined in advance is drawn in the virtual three-dimensional space as a three-dimensional character. Only a non-player character can be displayed as a two-dimensional character in which there is no uncomfortable feeling to the eye even when the non-player character is displayed as a two-dimensional character. In the case where there is fear to generate uncomfortable feeling to the eye when the non-player character is displayed as a two-dimensional character, the non-player character can be displayed as a three-dimensional character. This makes it possible to reduce processing load of hardware without losing realism (realistic sensation).

Moreover, in the present embodiment, the video game apparatus 100 is constructed so that the 2D display condition includes a condition that display luminance of a non-player character is a predetermined amount or less. Thus, it is possible to display a non-player character to be displayed as a two-dimensional character at a relatively dark place where there is no uncomfortable feeling to the eye even when the non-player character is displayed as a two-dimensional character. This makes it possible to reduce processing load of hardware without losing realism (realistic sensation).

Furthermore, in the embodiment described above, although a two-dimensional character drawn in the character image is displayed as a background, the video game apparatus 100 is constructed so that a non-player character allowed to have a conversation with the player character is included in the two-dimensional characters. Namely, although the two-dimensional character is treated as a background on the image display screen 51, the two-dimensional character is treated on the control so that a non-player character not being a background is positioned at a predetermined position. The video game apparatus 100 may control the two-dimensional non-player character so that the non-player character becomes a conversation allowable state when the player character is positioned in the vicinity of the position at which the non-player character is to be positioned. Since the video game apparatus 100 is constructed in this way, it is possible to increase the number of conversation allowable characters to be displayed.

Further, in the embodiment described above, the video game apparatus 100 is constructed so that a conversation allowable mark indicating that the non-player character is allowed to have a conversation with the player character is displayed in the vicinity of the non-player character that is allowed to have a conversation with the player character among the non-player characters drawn in the character image. Thus, the player can easily grasp the conversation allowable character.

In this regard, although it has not referred to in the embodiment described above, the video game apparatus 100 may be constructed so that a conversation allowable character arrangement map in which the player can recognize a display position of the non-player character that is allowed to have a conversation with the player character among the characters drawn in the character image is displayed. For example, a conversation allowable character arrangement map M as shown in FIG. 7 may be displayed in the image display screen 51. By constituting the video game apparatus 100 in this way, the player can easily grasp the position of the conversation allowable character.

Moreover, although it has not referred to in the embodiment described above, a character image may be displayed in which a non-player character changes display directions from the back side to the front side when the non-player character moves from a position at which the non-player character satisfies the 2D display condition (for example, a position distant from the player character, or a dark place) to a position at which the non-player character does not satisfy the 2D display condition (for example, a position near from the player character, or a light place). More specifically, for example, in the case where the non-player character approaches the player character from a distant position at which the 2D display condition is satisfied to a near position at which the 2D display condition is not satisfied, the non-player character may be displayed so as to gradually face the front side in accordance with a change in the distance. Further, for example, in the case where the non-player character moves from a dark place at which the 2D display condition is satisfied to a light place at which the 2D display condition is not satisfied, the non-player character may be displayed so as to gradually face the front side in accordance with a change in the brightness. Namely, in the case where the non-player character is to be changed from a two-dimensional character to a three-dimensional character, the display direction of the non-player character may be corrected in accordance with the movement direction of the non-player character. By constructing the video game apparatus 100 in this way, it is possible to adjust the direction of the non-player character between the front side thereof that is to be drawn in relatively detail and the back side thereof that is not required to be drawn in relatively detail. This makes it possible to prevent a display quality from being deteriorated to the eye. Moreover, as described above, since the non-player character is caused to move while facing the front or back side, the video game apparatus 100 can display a two-dimensional character without uncomfortable feeling to the eye by preparing a pair of display data on the two-dimensional character (that is, there is no need to prepare display data on a lateral side and a diagonal side of the non-player character).

Furthermore, although it has not referred to in the embodiment described above, a character image may be displayed in which a non-player character changes display directions from the front side to the back side when the non-player character moves from a position at which the non-player character does not satisfy the 2D display condition (for example, a position near from the player character, or a light place) to a position at which the non-player character satisfies the 2D display condition (for example, a position distant from the player character, or a dark place). More specifically, for example, in the case where the non-player character backs away from a near position at which the 2D display condition is not satisfied to a distant position at which the 2D display condition is satisfied, the non-player character may be displayed so as to gradually face from the front side to the back side in accordance with a change in the distance. Further, for example, in the case where the non-player character moves from a light place at which the 2D display condition is not satisfied to a dark place at which the 2D display condition is satisfied, the non-player character may be displayed so as to gradually face from the front side to the back side in accordance with a change in the brightness. Namely, in the case where the non-player character is to be changed from a three-dimensional character to a two-dimensional character, the direction of the non-player character may be corrected in accordance with the movement direction of the non-player character. By constructing the video game apparatus 100 in this way, it is possible to adjust the direction of the non-player character between the front side thereof that is to be drawn in relatively detail and the back side thereof that is not required to be drawn in relatively detail. This makes it possible to prevent a display quality from being deteriorated to the eye. Moreover, as described above, since the non-player character is caused to move while facing the front or back side, the video game apparatus 100 can display a two-dimensional character without uncomfortable feeling to the eye by preparing a pair of display data on the two-dimensional character (that is, there is no need to prepare display data on a lateral side and a diagonal side of the non-player character).

Further, although it has not referred to in the embodiment described above, the distance from the player character and/or the brightness in which the non-display condition is satisfied may be changed in accordance with an external size of the non-player character that is a target. More specifically, in the non-player character having a large external size, the distance from the player character in which the non-display condition is to be satisfied may be set to a relatively long distance, while in the non-player character having a small external size, the distance from the player character in which the non-display condition is to be satisfied may be set to a relatively short distance. Namely, the non-player character having a small external size becomes a non-display state at a step where the distance from the player character is relatively near (close). On the other hand, the non-player character having a large external size does not become a non-display state until the distance from the player character becomes relatively distant (far). By constructing the video game apparatus 100 in this way, it is possible to reduce processing load of hardware without deteriorating a display quality to the eye.

Moreover, in the embodiment described above, the video game apparatus 100 is constructed so that a display status of a non-player character is set to any one of "display as a three-dimensional character", "display as a two-dimensional character" and "non-display". For example, in the case where a non-player character is displayed as a three-dimensional character, the non-player character may be displayed by a normal polygon display method when the non-player character is positioned relatively near from the player character. On the other hand, the non-player character may be displayed by a simplified polygon model (for example, a model constituted from about a quarter of the normal number of polygons) when the non-player character is positioned relatively distant from the player character. By constructing the video game apparatus 100 in this way, it is possible to reduce processing load of hardware without deteriorating a display quality to the eye.

Furthermore, although it has not referred to in the embodiment described above, the video game apparatus 100 may be constructed so that: selection of one non-player character among the non-player characters in the vicinity of which a conversation allowable mark is displayed is received; a movement control process in which the player character is caused to move to the vicinity of the received one non-player character is executed; and a reply control process in which the one non-player character is caused to reply to a conversation request from the player character is executed by considering that the conversation is requested of the one non-player character when the movement is terminated. In this case, when the selection of a non-player character is received in accordance with operations of the input section 21 by the player, the control section 11 may cause the player character to move to the vicinity of the received non-player (it is preferable that in such movement the player character moves more quickly than that at a normal movement process). The control section 11 may execute a control process to reply the non-player character in consideration that the conversation is requested of the non-player character when the movement of the player character is terminated. By constituting the video game apparatus 100 in this way, the player character can easily execute a conversation with a non-player character that is positioned distant.

Further, although the video game apparatus main body 10 and the display device 50 are constructed from separate components in the embodiment described above, the display device 50 may be incorporated in the video game apparatus main body 10, as will be readily apparent to those skilled in the art, without departing from the scope of spirit of the invention.

Moreover, although an aspect of the present invention has been described with the video game apparatus 100 as an example, the present invention is not limited thereto. The present invention can be applied to various apparatuses such as a personal computer, a cellular phone terminal, a portable game apparatus and/or the like as long as such an apparatus has an image generating function. In this regard, in the case where the present invention is applied to a portable game apparatus or the like, a small-sized storage medium such as a semiconductor memory card may be used as the storage medium 70 described above in place of a CD-ROM or DVD-ROM, or any other type of storage medium as those skilled in the art will appreciate without departing from the scope or spirit of the present invention.

Furthermore, in the embodiment described above, although it has been described that game data for causing the video game apparatus main body 10 (video game apparatus 100) to execute various processes described above (that is, various data such as control program data used for the video game) are stored in the storage medium 70, the video game data may be delivered by a server apparatus such as a network server (WWW server), or other computer device connected (either wired or wireless) to a network, such as the Internet, a local area network, a wide area network, or the like, or any combination thereof. In this case, the video game apparatus main body 10 may obtain the video game data delivered by the server apparatus via the communication network 80, and store the video game data in the HDD 13. The video game data may be used by being loaded on the RAM 12 from the HDD 13. In this regard, although the video game data are explained in the above example, such data may include at least control program data for causing a computer to execute the image generating process in the embodiment as described above.

The present invention can be applied to a video game machine, a personal computer, a cellular phone terminal, a portable game apparatus and the like that generate a character image, in which multiple characters including a player character, a three-dimensional character drawn by three-dimensional polygon data and a two-dimensional character drawn by two-dimensional sprite data are drawn in a virtual three-dimensional space, used for displaying a conversation field in which the player character is allowed to have a conversation with other character. Therefore, the present invention is useful.

What is claimed is:

1. A method of generating a character image in which multiple characters, including a player character, a three-dimensional character drawn by three-dimensional polygon data and a two-dimensional character drawn by two-dimensional sprite data, are drawn in a virtual three-dimensional space, the character image displaying a conversation field in which the player character is enabled to have a conversation with another character, the method comprising:

determining that a character satisfying a predefined non-display condition is not drawn in the virtual three-dimensional space among characters positioned in a field of view of a virtual camera;

drawing, by a graphics processor, a character that satisfies a predetermined two-dimensional display condition as the two-dimensional character among the characters positioned in the field of view of the virtual camera;

drawing, by the graphics processor, a character that does not satisfy the two-dimensional display condition as the three-dimensional character among the characters positioned in the field of view of the virtual camera;

displaying, by the graphics processor, a conversation allowable mark in a vicinity of a character that is enabled to have a conversation with the player character among the characters drawn in the character image, the conversation allowable mark indicating that the character that is enabled to have a conversation with the player character is enabled to have a conversation with the player character;

receiving a selection of one character among the characters in the vicinity of the conversation allowable mark;

executing a movement control process in which the player character moves to a vicinity of the selected one character; and executing a reply control process in which the selected one character replies to a conversation request from the player character by considering that the conversation request is received when a movement is terminated, wherein the two-dimensional character drawn in the character image is enabled to have a conversation with the player character, wherein a conversation is executable with any conversation allowable character in the virtual three-dimensional space even when the conversation allowable character is located distantly from the player character, and wherein the predefined non-display condition is defined such that a character having a small external size achieves a non-display state when a distance between the character having the small external size and the player character is relatively small, and such that a character having a large external size does not achieve the non-display state until a distance between the character having the large external size and the player character is relatively large.

2. The method according to claim 1, wherein the two-dimensional display condition is satisfied when an amount of luminance associated with displaying the character that satisfies the predetermined two-dimensional display condition is less than or equal to a predetermined value.

3. The method according to claim 1, wherein the two-dimensional display condition is satisfied when the character that satisfies the predetermined two-dimensional display condition is positioned at least a predefined three-dimensional display distance from the player character.

4. The method according to claim 3, wherein the predefined non-display condition is satisfied when the character satisfying the predefined non-display condition is positioned at least a predefined non-display distance from the player character, and wherein the non-display distance is greater than the three-dimensional display distance.

5. The method according to claim 1, further comprising:
displaying, by the graphics processor, a conversation allowable character arrangement map in which the player character recognizes a display position of a character that is enabled to have a conversation with the player character among the characters drawn in the character image.

6. An image generating apparatus for generating a character image in which multiple characters, including a player character, a three-dimensional character drawn by three-dimensional polygon data and a two-dimensional character drawn by two-dimensional sprite data, are drawn in a virtual three-dimensional space, the character image displaying a conversation field in which the player character is enabled to have a conversation with another character, the image generating apparatus comprising:
a non-display condition determiner, implemented by a graphics processor, that determines that a character satisfying a predefined non-display condition is not drawn in the virtual three-dimensional space among characters positioned in a field of view of a virtual camera;
a two-dimensional character drawer, implemented by the graphics processor, that draws a character that satisfies a predetermined two-dimensional display condition as the two-dimensional character among the characters positioned in the field of view of the virtual camera;
a three-dimensional character drawer, implemented by the graphics processor, that draws a character that does not satisfy the two-dimensional display condition as the three-dimensional character among the characters positioned in the field of view of the virtual camera;
a conversation allowable mark controller, implemented by the graphics processor, that displays a conversation allowable mark in a vicinity of a character that is enabled to have a conversation with the player character among the characters drawn in the character image, the conversation allowable mark indicating that the character that is enabled to have a conversation with the player character is enabled to have a conversation with the player character;
a selection receiver, implemented by the graphics processor, that receives a selection of one character among the characters in the vicinity of the conversation allowable mark;
a movement controller, implemented by the graphics processor, that executes a movement control process in which the player character moves to a vicinity of the selected one character; and
a reply controller, implemented by the graphics processor, that executes a reply control process in which the selected one character replies to a conversation request from the player character by considering that the conversation request is received when a movement is terminated,
wherein the two-dimensional character drawn in the character image is enabled to have a conversation with the player character,
wherein a conversation is executable with any conversation allowable character in the virtual three-dimensional space even when the conversation allowable character is located distantly from the player character, and
wherein the predefined non-display condition is defined such that a character having a small external size achieves a non-display state when a distance between the character having the small external size and the player character is relatively small, and such that a character having a large external size does not achieve the non-display state until a distance between the character having the large external size and the player character is relatively large.

7. The image generating apparatus according to claim 6, wherein the two-dimensional display condition is satisfied when an amount of luminance associated with displaying the character that satisfies the predetermined two-dimensional display condition is less than or equal to a predetermined value.

8. The image generating apparatus according to claim 6, wherein the two-dimensional display condition is satisfied when the character that satisfies the predetermined two-dimensional display condition is positioned at least a predefined three-dimensional display distance from the player character.

9. The image generating apparatus according to claim 8, wherein the predefined non-display condition is satisfied when the character satisfying the predefined non-display condition is positioned at least a predefined non-display distance from the player character, and wherein the non-display distance is greater than the three-dimensional display distance.

10. The image generating apparatus according to claim 6, further comprising:
a map display controller, implemented by the graphics processor, that controls a display of a conversation allowable character arrangement map in which the player character recognizes a display position of a character that is enabled to have a conversation with the player character among the characters drawn in the character image.

11. A non-transitory, tangible computer readable medium that stores a computer program product for generating a character image in which multiple characters, including a player character, a three-dimensional character drawn by three-dimensional polygon data and a two-dimensional character drawn by two-dimensional sprite data, are drawn in a virtual three-dimensional space, the character image displaying a conversation field in which the player character is enabled to have a conversation with another character, the tangible computer readable medium comprising:
a determining code segment, recorded on the tangible computer readable medium, that determines that a character satisfying a predefined non-display condition is not drawn in the virtual three-dimensional space among characters positioned in a field of view of a virtual camera;
a first drawing code segment, recorded on the tangible computer readable medium, that draws a character that satisfies a predetermined two-dimensional display condition as the two-dimensional character among the characters positioned in the field of view of the virtual camera;

a second drawing code segment, recorded on the tangible computer readable medium, that draws a character that does not satisfy the two-dimensional display condition as the three-dimensional character among the characters positioned in the field of view of the virtual camera;

a mark displaying code segment, recorded on the tangible computer readable medium, that displays a conversation allowable mark in a vicinity of a character that is enabled to have a conversation with the player character among the characters drawn in the character image, the conversation allowable mark indicating that the character that is enabled to have a conversation with the player character is enabled to have a conversation with the player character;

a receiving code segment, recorded on the tangible computer readable medium, that receives a selection of one character among the characters in the vicinity of the conversation allowable mark;

a movement executing code segment, recorded on the tangible computer readable medium, that executes a movement control process in which the player character moves to a vicinity of the selected one character; and a reply executing code segment, recorded on the tangible computer readable medium, that executes a reply control process in which the selected one character replies to a conversation request from the player character by considering that the conversation request is received when a movement is terminated, wherein the two-dimensional character drawn in the character image is enabled to have a conversation with the player character, wherein a conversation is executable with any conversation allowable character in the virtual three-dimensional space even when the conversation allowable character is located distantly from the player character, and wherein the predefined non-display condition is defined such that a character having a small external size achieves a non-display state when a distance between the character having the small external size and the player character is relatively small, and such that a character having a large external size does not achieve the non-display state until a distance between the character having the large external size and the player character is relatively large.

12. The non-transitory, tangible computer readable medium that stores a computer program product according to claim 11, wherein the two-dimensional display condition is satisfied when an amount of luminance associated with displaying the character that satisfies the predetermined two-dimensional display condition is less than or equal to a predetermined value.

13. The non-transitory, tangible computer readable medium that stores a computer program product according to claim 11, wherein the two-dimensional display condition is satisfied when the character that satisfies the predetermined two-dimensional display condition is positioned at least a predefined three-dimensional display distance from the player character.

14. The non-transitory, tangible computer readable medium that stores a computer program product according to claim 13, wherein the predefined non-display condition is satisfied when the character satisfying the predefined non-display condition is positioned at least a predefined non-display distance from the player character, and wherein the non-display distance is greater than the three-dimensional display distance.

15. The non-transitory, tangible computer readable medium that stores a computer program product according to claim 11, further comprising:

a map displaying code segment, recorded on the tangible computer readable medium, that displays a conversation allowable character arrangement map in which the player character recognizes a display position of a character that is enabled to have a conversation with the player character among the characters drawn in the character image.

16. The method according to claim 1, wherein a character drawn in the character image is displayed, by the graphics processor, in a front position when the two-dimensional display condition is satisfied, and wherein a character drawn in the character image is displayed, by the graphics processor, in a back position when the two-dimensional display condition is not satisfied.

17. The non-transitory, tangible computer readable medium that stores a computer program product according to claim 12, further comprising:

a map displaying code segment, recorded on the tangible computer readable medium, that displays a conversation allowable character arrangement map in which the player character recognizes a display position of a character that is enabled to have a conversation with the player character among the characters drawn in the character image.

18. The non-transitory, tangible computer readable medium that stores a computer program product according to claim 13, further comprising:

a map displaying code segment, recorded on the tangible computer readable medium, that displays a conversation allowable character arrangement map in which the player character recognizes a display position of a character that is enabled to have a conversation with the player character among the characters drawn in the character image.

19. The image generating apparatus according to claim 7, further comprising:

a map display controller, implemented by the graphics processor, that controls a display of a conversation allowable character arrangement map in which the player character recognizes a display position of a character that is enabled to have a conversation with the player character among the characters drawn in the character image.

20. The method according to claim 2, further comprising:

displaying, by the graphics processor, a conversation allowable character arrangement map in which the player character recognizes a display position of a character that is enabled to have a conversation with the player character among the characters drawn in the character image.

* * * * *